United States Patent
Baker

(10) Patent No.: US 9,027,661 B2
(45) Date of Patent: May 12, 2015

(54) FOAM CHAMBER HAVING A CLOSABLE TESTING OUTLET

(76) Inventor: Kenneth C. Baker, Mansfield, TX (US)

( * ) Notice: Subject to any disclaimer, the term of this patent is extended or adjusted under 35 U.S.C. 154(b) by 519 days.

(21) Appl. No.: 13/495,446

(22) Filed: Jun. 13, 2012

(65) Prior Publication Data

US 2013/0168108 A1 Jul. 4, 2013

Related U.S. Application Data

(60) Provisional application No. 61/580,890, filed on Dec. 28, 2011.

(51) Int. Cl.
| | |
|---|---|
| A62C 3/06 | (2006.01) |
| A62C 37/50 | (2006.01) |
| A62C 5/02 | (2006.01) |
| E03C 1/084 | (2006.01) |
| B05B 1/26 | (2006.01) |
| A62C 35/02 | (2006.01) |
| G01M 99/00 | (2011.01) |

(52) U.S. Cl.
CPC . *A62C 37/50* (2013.01); *A62C 3/06* (2013.01); *A62C 5/022* (2013.01); *E03C 1/084* (2013.01); *B05B 1/267* (2013.01); *A62C 35/023* (2013.01); *G01M 99/008* (2013.01); *Y10S 261/26* (2013.01); *A62C 3/065* (2013.01); *A62C 5/02* (2013.01)

(58) Field of Classification Search
CPC .......... A62C 3/065; A62C 37/50; A62C 5/02; A62C 3/06; A62C 35/023; A62C 5/022; Y10S 261/26; E03C 1/084; B05B 1/267; G01M 99/008

USPC .................. 169/5, 9, 14, 15, 16, 54, 66, 68; 239/419.5, 423, 424, 425.5, 428.5, 239/499, 518, 521, 523, 524, 553, 553.5, 239/590, 590.5; 261/116, DIG. 26; 73/865.9

See application file for complete search history.

(56) References Cited

U.S. PATENT DOCUMENTS

| | | | | |
|---|---|---|---|---|
| 1,754,005 | A | * | 4/1930 | Witter .............................. 169/66 |
| 2,202,176 | A | * | 5/1940 | Timpson ........................ 261/116 |
| 2,553,293 | A | * | 5/1951 | Bedford .......................... 169/66 |
| 3,592,269 | A | * | 7/1971 | Stults ................................ 169/9 |
| 3,709,302 | A | | 1/1973 | Stults |
| 3,750,754 | A | | 8/1973 | Stults |
| 4,828,038 | A | * | 5/1989 | Williams ........................ 169/15 |
| 4,838,356 | A | * | 6/1989 | Akatsu ........................... 169/66 |
| 5,069,291 | A | | 12/1991 | O'Connell |
| 7,975,773 | B2 | | 7/2011 | Murata et al. |

* cited by examiner

*Primary Examiner* — Steven J Ganey
(74) *Attorney, Agent, or Firm* — Shumaker, Loop & Kendrick, LLP

(57) ABSTRACT

A foam chamber of a fire suppressant system having a closable testing outlet is disclosed. The foam chamber can operate in a testing mode and an operation mode. The invention has an inlet conduit for accepting a fire suppressant fluid attached to an expansion conduit. An expansion enclosure having two closable outlets is also attached to the inlet conduit and surrounds the expansion conduit. One outlet empties into the expansion enclosure. The other outlet extends through the wall of the expansion enclosure and empties outside of the expansion enclosure. Both of the closable outlets can be fitted with either an unbreakable seal or a frangible seal. If the foam chamber is configured for normal operation, the unbreakable seal is placed on the outlet that extends through the wall of the expansion enclosure and a frangible seal is placed on the outlet that empties into the expansion enclosure.

19 Claims, 4 Drawing Sheets

FOAM CHAMBER HAVING A CLOSABLE TESTING OUTLET

CROSS-REFERENCE TO RELATED APPLICATIONS

This application is a non-provisional application claiming the benefit of current application having application No. 61/580,890 filed on Dec. 28, 2011.

TECHNICAL FIELD AND BACKGROUND OF INVENTION

The present invention relates to the field of firefighting and more specifically to the field of firefighting utilizing aerated foam via a foam chamber as a fire suppressant in storage environments. For example, when a flammable liquid is stored in a tank it is common for regulations to require that a fixed fire protection system be provided and situated above the stored liquid level. Such fire protection may take the form of a fire suppressant fluid that is aerated in a foam chamber to produce a foam discharged at the top of a storage container or tank, the fire suppressant fluid being supplied by a supply line to a foam chamber where air or inert gas is mixed as the fluid expands within the foam chamber.

The basic design of foam chambers is controlled by Underwriter's Laboratory Standard 162, the Standard of Safety for Foam Equipment and Liquid Concentrates. This standard sets forth certain requirements for foam chamber design, the main requirements being a means to aerate foam solution into a viable fire fighting foam and a means to prevent flammable or combustible vapor from escaping from the tank by use of a frangible vapor seal. This frangible vapor seal is required to withstand pressure at the inlet to the foam chamber of a least 7 psi, but is required to rupture before reaching a maximum inlet pressure of 25 psi.

Following the Standard 162, many foam chamber designs share several features including: a flow control means, an aeration means, a secondary expansion means, a tertiary expansion means, a discharge means, a vapor seal, and a means to gain access to the interior of the foam chamber.

With respect to the flow control means, many foam chambers utilize either an orifice plate or a flow nozzle to control the flow rate at a given inlet pressure.

Many foam chambers currently available that apply an aeration means utilize an internal device to break up the stream of fire suppressant flowing through the inlet orifice or the nozzle, depending on which is used, so that the fluid spreads to fill an inlet conduit thereby entraining air that enters through a series of openings in the inlet conduit and expands the solution with air to a volume about equal to two times the solution volume and reduce the velocity by approximately 30-40% and reducing the pressure inside the conduit thereby resulting in a partially aerated foam.

Many prior art foam chambers utilize a conduit approximately two times the cross section area of the inlet conduit to further reduce the velocity of the expanding aerated solution to approximately 30-40% of the solution inlet velocity, again reducing the pressure inside the conduit resulting in higher expansion.

Tertiary expansion means found in many foam chambers in the prior art utilize a third conduit or expansion enclosure for a final expansion phase with the third conduit being approximately four to five times the cross section of the secondary expansion means thus resulting in a further drop in velocity and internal pressure, and development of a final expanded fire fighting foam.

It is common in the prior art for foam chambers to utilize a fourth conduit as a discharge means, usually approximately three to four times the cross section of the first aeration means conduit. The discharge from this conduit is directed to the interior of the flammable liquid storage tank where a device known as a deflector directs the discharge so that it flows down the inside wall of the flammable liquid storage tank where it is gently applied to the surface of the burning flammable liquid.

Vapor seals utilized in many foam chambers currently available can be divided into two basic types. The first type, and most common, is a vapor seal located at the outlet of the secondary expansion means conduit. The most common material used for vapor seals when located at this point is glass that has been scored or possibly otherwise altered to control the breaking pressure. The second type, and least used, is to use a vapor seal located at the discharge from the tertiary expansion means.

Many prior art foam chambers currently available utilize a removable access means, usually consisting of a plate or a hatch that is bolted, screwed, or otherwise removably attached to the top end of the tertiary expansion means. Because of the design of the prior art, this access means must be removed any time the foam chamber is to be tested, and with most existing foam chambers having the vapor seal at the discharge of the secondary expansion conduit, an additional discharge device must be installed to direct the foam discharge away from the tertiary expansion conduit to prevent its entering the protected tank through the discharge means conduit. If the vapor seal is located at the entrance of the discharge means conduit, expanded foam is prevented from entering the tank, however, the foam chamber access means must be left open for testing.

In the course of utilizing a foam chamber fire suppressant system, it sometimes becomes necessary to test various components of the system to ensure safe and reliable function. As described above, testing of foam discharge and the frangible seal of a foam chamber can be difficult if not impossible under the prior art. None of the basic designs described above, covering all known present designs, allow easy testing of foam discharge from the foam chamber without opening of the access means and applying an additional device, and allow no method for testing the vapor seals after foam chambers are placed in active service. Thus there exists a need in the art for a foam chamber that allows for quick and clean testing of both the foam chamber functionality and of the frangible vapor seal without risking contamination of the storage container or tank contents.

SUMMARY OF THE INVENTION

Accordingly, it is an object of the present invention to provide a foam chamber that facilitates quick and clean testing of both the foam chamber functionality and the frangible vapor seal functionality without risking contamination of the storage tank or leaving the tertiary expansion conduit/enclosure exposed and open.

These and other objects and advantages of the invention are achieved by providing a foam chamber having a closable testing outlet. As will be shown in greater detail below, this closable testing outlet is attached to the secondary expansion conduit, which is attached to an inlet conduit, and extends through the outer wall of the tertiary expansion enclosure. The closable testing outlet can be fitted with a frangible seal or an unbreakable seal as necessary for operation or testing. Essentially, then, the closable testing outlet is the same as the secondary expansion outlet, also called the closable operation outlet, except that the closable testing outlet is located outside of the tertiary expansion enclosure and the closable operation outlet is located within the tertiary expansion enclosure.

According to one embodiment of the invention, the closable operation outlet and the closable testing outlet have the same diameter and each further has a vapor seal holder. The vapor seal holder securely holds either the unbreakable seal or the frangible seal with the frangible seal designed to rupture between 7 PSIG and 25 PSIG.

According to another embodiment of the invention, the inlet conduit also has a second smaller inlet conduit and a dispersant device. The second smaller inlet conduit and the inlet conduit both have a plurality of openings for allowing the introduction of a second fluid. Also, the inlet conduit has a flanged or threaded opening for connecting with a fire suppressant fluid supply conduit.

According to another embodiment of the invention, the configuration of the seals within the vapor seal holders allows the foam chamber to be configured for an operation mode, a frangible seal testing mode, or a foaming testing mode. During the operation mode, a frangible seal is placed in the vapor seal holder of the closable operation outlet and an unbreakable seal is placed in the vapor seal holder of the closable testing outlet. During the frangible seal testing mode, the unbreakable seal is placed in the vapor seal holder of the closable operation outlet and the frangible seal is placed in the vapor seal holder of the closable testing outlet. During the foaming mode, either the frangible seal or the unbreakable seal may be placed in the vapor seal holder of the closable operation outlet but no seal or closure is placed in the closable testing outlet.

According to another embodiment of the invention, the length of the inlet conduit is no less than two times, nor more than five times the interior width of the inlet conduit.

According to another embodiment of the invention, the second smaller inlet conduit is centered within the inlet conduit, is concentrically attached to the flanged opening of the inlet conduit, and is between 25% and 75% the length of the inlet conduit.

According to another embodiment of the invention, the expansion conduit is of greater internal width than the inlet conduit and is concentrically attached to the outlet end of the inlet conduit.

According to another embodiment of the invention, the expansion enclosure is of greater internal width than the expansion conduit and is concentrically attached to the outlet end of the inlet conduit.

According to another embodiment of the invention, the outlet conduit comprises a flanged opening for attaching to a storage container, is approximately double the inside width of the inlet conduit, and is perpendicular to the inlet conduit, expansion conduit, and expansion enclosure.

According to another embodiment of the invention, the closable testing outlet of the expansion conduit is perpendicular to the inlet conduit, expansion conduit, and expansion enclosure.

According to another embodiment of the invention, the fire suppressant fluid is a liquid and the second fluid is a gas.

According to another embodiment of the invention, gas of the second fluid is air.

According to another embodiment of the invention, the gas of the second fluid is an inert gas.

According to another embodiment of the invention, the inlet conduit has either a round or a square cross section design.

According to another embodiment of the invention, the final expansion enclosure has a round, a triangular, a square, or another multi-sided cross section design.

According to another embodiment of the invention, the flanged opening of the inlet conduit and the flanged opening of the outlet conduit are according to ANSI, DIN, or JIS standard flange bolting patterns and sizes, or is threaded.

According to another embodiment of the invention, the frangible seals and the unbreakable seals are secured in the vapor seal holders by a securing means that has threaded fasteners, a bayonet type clamp, over-center type clamps, or a threaded clamp.

BRIEF DESCRIPTION OF THE SEVERAL VIEWS OF THE DRAWINGS

Some of the objects of the invention have been set forth above. Other objects and advantages of the invention will appear as the description of the invention proceeds when taken in conjunction with the following drawings, in which.

DETAILED DESCRIPTION

It is to be understood by a person having ordinary skill in the art that the present discussion is a description of exemplary embodiments only and is not intended as limiting the broader aspects of the present invention. The following example is provided to further illustrate the invention and is not to be construed to unduly limit the scope of the invention.

Figure 4:
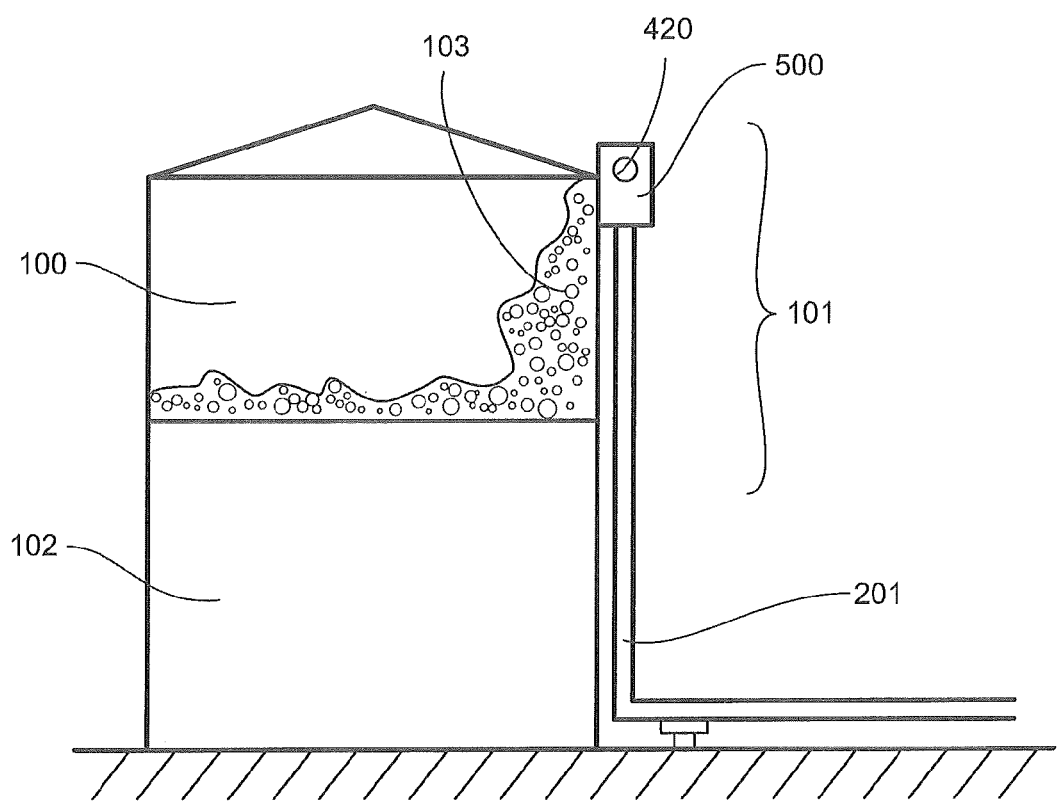
FIG. 4 is a side view of the foam chamber attached to a storage tank and supply line.

Referring to FIG. 4, as discussed above, in situations where flammable fluids 102 are to be stored in a tank 100, it is common to position a fire suppressant system 101 above the flammable fluid 102 in storage. Aerated fire suppressant foam 103 is supplied to the storage tank 100 via a foam chamber 200 which aerates and expands a fire suppressant fluid 104 it receives from a fire suppressant fluid supply conduit 201.

Figure 3:
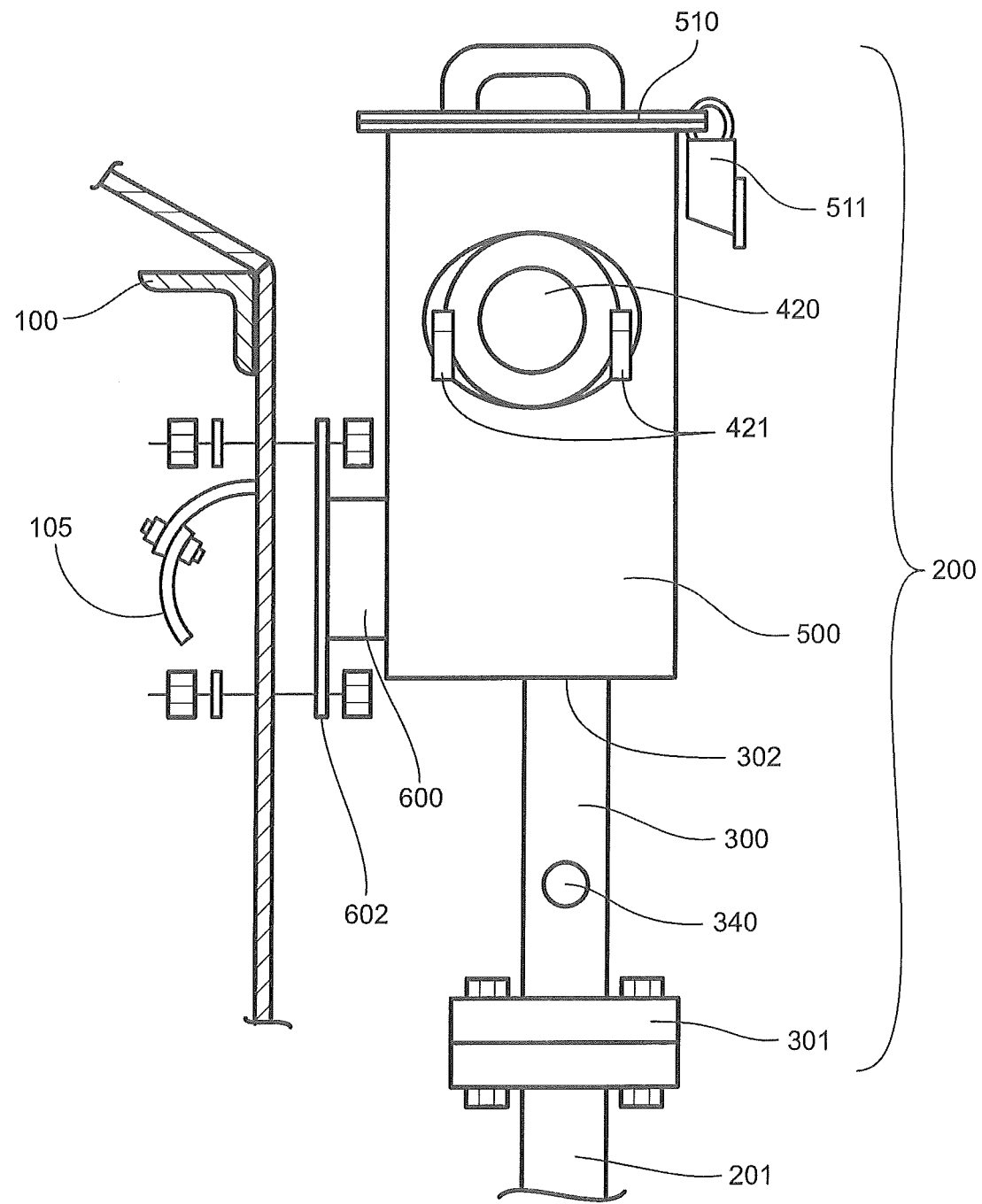
FIG. 3 is a side view of the foam chamber.

Referring to FIG. 3, once the fire suppressant fluid 104 has been expanded and aerated becoming fire suppressant foam 103, it exits the foam chamber 200 and enters the tank 100 through an outlet conduit 600. The discharge from this outlet conduit 600 is directed to the interior of the storage tank 100 where a deflector 105 directs the discharge so that it flows down the inside wall of the storage tank 100.

Figure 1:
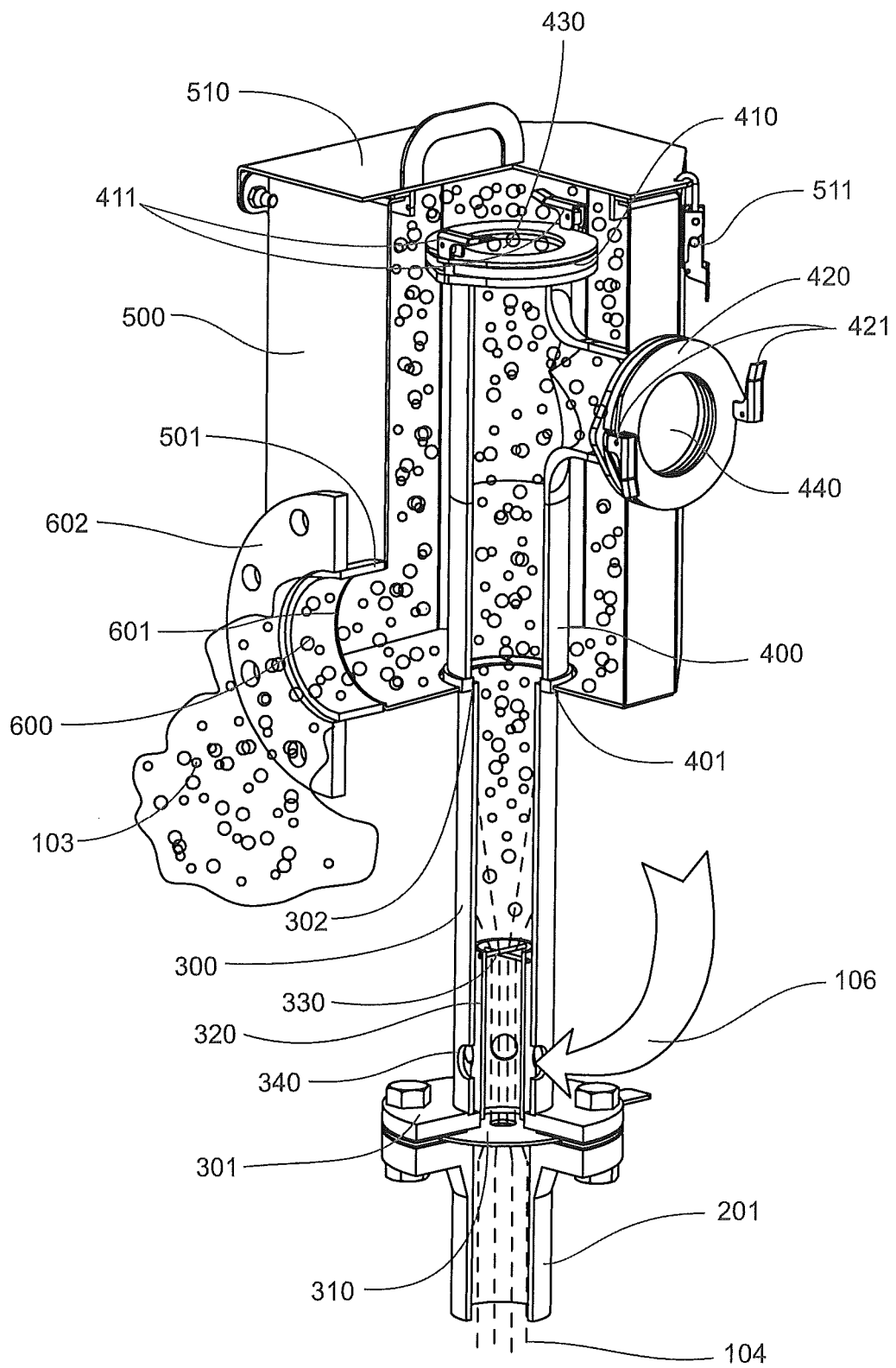
FIG. 1 is a partial cutaway view of the foam chamber configured for operation.
Figure 2:
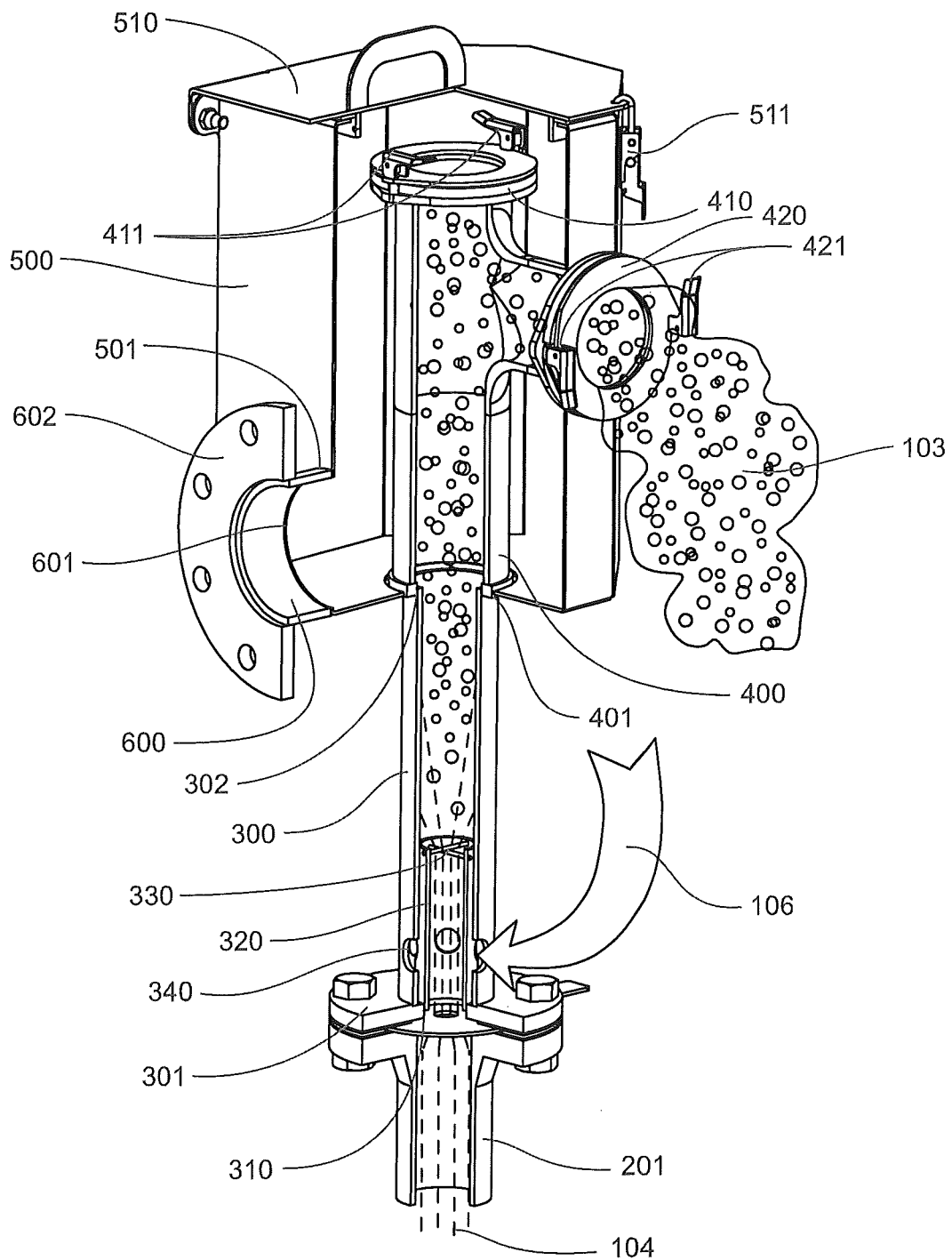
FIG. 2 is a partial cutaway view of the foam chamber configured for testing.

Referring to FIG. 1 and FIG. 2, a foam chamber 200 is disclosed that receives fire suppressant fluid 104 from a fire suppressant fluid supply conduit 201. The fire suppressant fluid supply conduit 201 is attached to an open, inlet flange 301 of an inlet conduit 300. The inlet conduit 300 has an open, outlet end 302 at the end opposite the open flange 301. There is a flow control orifice 310 located between the open flange 301 of the inlet conduit 300 and the fire suppressant fluid supply conduit 201. Located within the inlet conduit 300 is a second smaller inlet conduit 320. The second smaller inlet conduit supports a dispersant device 330 at its end opposite the flow control orifice 310. Both the inlet conduit 300 and the second smaller inlet conduit 320 contain a plurality of openings 340 allowing a second fluid 106 such as air or an inert gas to enter.

An expansion conduit 400 (also referred to as a secondary expansion conduit) is attached to the inlet conduit 300. The expansion conduit 400 has a diameter larger than the inlet conduit 300 and is concentrically attached to the inlet conduit 300 at an open end 401. Importantly, the expansion conduit 400 comprises a closable operation outlet 420 and a closable testing outlet 420. Both the closable operation outlet 410 and the closable testing outlet 420 are of the same diameter and feature vapor seal holders 411 & 421. These vapor seal holders 411 & 421 can removably and interchangeably hold a frangible seal 430 or an unbreakable seal 440. The closable operation outlet 410 discharges within an expansion enclosure 500 (also referred to as a tertiary expansion conduit) whereas the closable testing outlet 420 extends through and discharges outside of the expansion enclosure 500.

The expansion enclosure 500 (also referred to as a tertiary expansion conduit) surrounds the expansion conduit 400 and is attached to the expansion conduit 400 and to the inlet conduit 300 at the point where the expansion conduit 400 and the inlet conduit 300 are attached. The expansion enclosure 500 is concentric with the expansion conduit 400 and the inlet conduit 300 and has a diameter larger than the expansion conduit 400. The expansion enclosure 500 also has a removable closure 510, a device for securing the removable closure 511, and an outlet end 501 that attaches to a discharge/outlet conduit 600.

The discharge conduit 600 has an inlet end 601 attached to the outlet end 501 of the expansion enclosure 500 and it has a flanged outlet end 602 for attaching to the storage tank 100.

The foam chamber of the present invention can be configured for normal operation by placing a frangible seal 430 in the closable operation outlet 410 of the expansion conduit 400 and by placing an unbreakable seal 440 in the closable testing outlet 420 of the expansion conduit 400.

The foam chamber 200 of the present invention can be configured for testing the foaming function of the foam chamber 200 by placing a frangible seal 430 in the closable operation outlet 410 of the expansion conduit (or by leaving the frangible seal 430 in the closable operation outlet 410 of the expansion conduit 400 if such a seal was already in place thereby negating the need to open the top 510 of the expansion enclosure 500 to gain access) and by removing the unbreakable seal 440 in the closable testing outlet 420 of the expansion conduit 400 such that any foam will flow through the closable testing outlet 420 thereby bypassing the expansion enclosure 500, and importantly, the storage tank 100.

The foam chamber of the present invention can be configured for testing the frangible seal 430 by placing an unbreakable seal 440 in the closable operation outlet 410 of the expansion conduit 400 and by placing the frangible seal 430 in the closable testing outlet 420 of the expansion conduit 400 such that once the frangible seal 430 is broken, any foam will flow through the closable testing outlet 420 thereby bypassing the expansion enclosure 500, and importantly, the storage tank 100.

While has been described with reference to specific embodiments and examples, it is envisioned that various details of the invention may be changed without departing from the scope of the invention. Furthermore, the foregoing description of the preferred embodiments of the invention and best mode for practicing the invention are provided for the purpose of illustration only and not for the purpose of limitation.

I claim:

1. A foam chamber for a fire suppressant system that permits rapid and clean testing of foam chamber and vapor seal functionality, comprising:
    (a) an inlet conduit having an inlet end and an outlet end for containing a fire suppressant fluid and further comprising a plurality of openings for the introduction of a second fluid for the aeration of the fire suppressant fluid into a fire suppressant foam;
    (b) a dispersant device attached to and located within the inlet conduit for deflecting the fire suppressant fluid in a spray pattern;
    (c) an expansion conduit attached to the inlet conduit and having an inlet end, a closable operation outlet terminating within an expansion enclosure surrounding the expansion conduit, and including a removable closure and an outlet, and a closable testing outlet terminating outside of the expansion enclosure; and
    (d) an outlet conduit attached to the outlet of the expansion enclosure for discharging the fire suppressant foam.

2. The foam chamber of claim 1 wherein the closable operation outlet and the closable testing outlet of the expansion conduit have the same diameter and each further comprises an vapor seal holder for removably holding a seal having a diameter approximately equal to the inside diameter of the outlet and wherein the seal is either an unbreakable seal or a frangible seal designed to rupture at no less than 7 PSIG and no greater than 25 PSIG.

3. The foam chamber of claim 2 wherein the inlet conduit further comprises:
    (a) a flanged opening at the inlet end designed for coupling to a fire suppressant fluid supply conduit and attached to a flow control orifice for increasing fluid velocity; and
    (b) a second inlet conduit adapted to fit into the inlet conduit for supporting the dispersant device attached to both the inlet conduit and the dispersant device and having a plurality of openings.

4. The foam chamber of claim 3 wherein:
    (a) the length of the inlet conduit is no less than two times, nor more than five times the interior width of the inlet conduit;
    (b) the second inlet conduit is centered within the inlet conduit, is concentrically attached to the flanged opening of the inlet conduit, and is between 25% and 75% the length of the inlet conduit;
    (c) the expansion conduit is of greater internal width than the inlet conduit and is concentrically attached to the outlet end of the inlet conduit;
    (d) the expansion enclosure is of greater internal width than the expansion conduit and is concentrically attached to the outlet end of the inlet conduit;
    (e) the outlet conduit comprises a flanged opening for attaching to a storage container, is approximately double the inside width of the inlet conduit, and is perpendicular to the inlet conduit, expansion conduit, and expansion enclosure; and
    (f) the closable testing outlet of the expansion conduit is perpendicular to the inlet conduit, expansion conduit, and expansion enclosure.

5. The foam chamber of claim 4 wherein the foam chamber is optionally configurable in:
    (a) an operation mode wherein the frangible seal is installed in the vapor seal holder of the closable operation outlet and the unbreakable seal is installed in the vapor seal holder of the closable testing outlet;
    (b) a frangible seal testing mode wherein the unbreakable seal is installed in the vapor seal holder of the closable operation outlet and the frangible seal is installed in the vapor seal holder of the closable testing outlet; or
    (c) a foaming testing mode, wherein either the unbreakable seal or the frangible seal is installed in the vapor seal holder of the closable operation outlet and no seal is installed in the vapor seal holder of the closable testing outlet, such that the closable testing outlet is left open.

6. The foam chamber of claim 5, wherein the fire suppressant fluid is a liquid and the second fluid is a gas.

7. The foam chamber of claim 6, wherein the gas is air.

8. The foam chamber of claim 6, wherein the gas is an inert gas.

9. The foam chamber of claim 6, wherein the inlet conduit has either a circular or a square cross section design.

10. The foam chamber of claim 9, wherein the expansion enclosure has a round, triangular, square, or other multi-sided cross section design.

11. The foam chamber of claim 10, wherein the flanged opening of the inlet conduit and the flanged opening of the outlet conduit are according to ANSI, DIN, or JIS standard flange bolting patterns and sizes.

12. The foam chamber of claim 11, wherein the frangible seals and the unbreakable seals are secured in the vapor seal holders by a securing means selected from the group consisting of: threaded fasteners, bayonet type clamps, over-center type clamps, and threaded clamps.

13. A foam chamber for a fire suppressant system that permits rapid and clean testing of foam chamber and vapor seal functionality comprising:
   (a) an inlet conduit for containing a fire suppressant fluid and further comprising a plurality of openings for the introduction of a second fluid for aeration of the fire suppressant fluid into a fire suppressant foam, an inlet end, and outlet end;
   (b) a second inlet conduit attached to the inlet conduit and adapted to fit within the inlet conduit and further comprising a plurality of openings for the introduction of the second fluid, an inlet end, and outlet end;
   (c) a dispersant device attached to and located within the inlet conduit and at the end of the second smaller inlet conduit for deflecting the fire suppressant fluid in a spray pattern;
   (d) an expansion enclosure comprising a removable closure for accessing an interior portion of the expansion enclosure, and an outlet attached to an outlet conduit for discharging the fire suppressant foam, and surrounding an expansion conduit attached to the inlet conduit and the expansion conduit further comprising an inlet end, a closable operation outlet terminating within the expansion enclosure having a vapor seal holder for removably holding a seal wherein the seal is either an unbreakable seal or a frangible seal, and a closable testing outlet terminating outside of the expansion enclosure having a vapor seal holder for removably holding a seal wherein the seal is either an unbreakable seal or a frangible seal.

14. The foam chamber of claim 13 wherein the foam chamber is optionally configurable in:
   (a) an operation mode wherein the frangible seal is installed in the vapor seal holder of the closable operation outlet and the unbreakable seal is installed in the vapor seal holder of the closable testing outlet;
   (b) a frangible seal testing mode wherein the unbreakable seal is installed in the vapor seal holder of the closable operation outlet and the frangible seal is installed in the vapor seal holder of the closable testing outlet; or
   (c) a foaming testing mode wherein either the unbreakable seal or the frangible seal is installed in the vapor seal holder of the closable operation outlet and no seal is installed in the vapor seal holder of the closable testing outlet such that the closable testing outlet is left open.

15. A foam chamber for a fire suppressant system that permits rapid and clean testing of foam chamber and vapor seal functionality comprising:
   (a) an inlet conduit for receiving, expanding, and aerating a fire suppressant fluid into a fire suppressant foam;
   (b) an expansion enclosure for further expanding a fire suppressant foam terminating in an outlet conduit for discharging a fire suppressant foam into a storage tank; and
   (c) an expansion conduit for expanding a fire suppressant foam into which the inlet conduit terminates having an outlet terminating inside the expansion enclosure for allowing normal operation of the foam chamber and an outlet terminating outside the expansion enclosure for allowing testing of the foam chamber with each of the outlets having a vapor seal holder for holding either a frangible seal or an unbreakable seal,
   wherein the inlet conduit further comprises a second smaller inlet conduit for supporting a dispersant device located at its end for deflecting the fire suppressant fluid in a spray pattern, both the inlet conduit and the second smaller inlet conduit have a plurality of openings for receiving a second fluid for aerating the fire suppressant fluid into the fire suppressant foam, and
   wherein the expansion enclosure further comprises a removable closure for accessing the interior of the enclosure.

16. The foam chamber of claim 15 wherein the foam chamber is optionally configurable in:
   (a) an operation mode wherein the frangible seal is installed in the vapor seal holder of outlet terminating inside the expansion enclosure and the unbreakable seal is installed in the vapor seal holder of outlet terminating outside the expansion enclosure;
   (b) a frangible seal testing mode wherein the unbreakable seal is installed in the vapor seal holder of outlet terminating inside the expansion enclosure and the frangible seal is installed in the vapor seal holder of the outlet terminating outside the expansion enclosure; or
   (c) a foaming testing mode wherein either the unbreakable seal or the frangible seal is installed in the vapor seal holder of the outlet terminating inside the expansion enclosure and no seal is installed in the vapor seal holder of the outlet terminating outside the expansion enclosure such that the outlet terminating outside the expansion enclosure is left open.

17. The foaming chamber of claim 16 wherein the outlet terminating inside the expansion enclosure and the outlet terminating outside the expansion enclosure of the expansion conduit have the same diameter and wherein the frangible seal ruptures at no less than 7 PSIG and no greater than 25 PSIG and has a diameter approximately equal to the inside diameter of the outlets.

18. The foam chamber of claim 16 wherein:
   (a) the length of the inlet conduit is no less than two times, nor more than five times an interior width of the inlet conduit;
   (b) the second inlet conduit is centered within the inlet conduit, is concentrically attached to a flanged opening of the inlet conduit, and is between 25% and 75% the length of the inlet conduit;
   (c) the expansion conduit is of greater internal width than the inlet conduit and is concentrically attached to an outlet end of the inlet conduit;

(d) the expansion enclosure is of greater internal width than the expansion conduit and is concentrically attached to an outlet end of the inlet conduit;
(e) the outlet conduit comprises a flanged opening for attaching to a storage container, is approximately double the inside width of the inlet conduit, and is perpendicular to the inlet conduit, expansion conduit, and expansion enclosure; and
(f) the outlet terminating outside the expansion enclosure is perpendicular to the inlet conduit, the expansion conduit, and the expansion enclosure.

19. The foam chamber of claim 15 wherein the fires suppressant fluid is a liquid and the second fluid is a gas.

* * * * *